(12) United States Patent
Handshaw et al.

(10) Patent No.: US 11,630,966 B2
(45) Date of Patent: Apr. 18, 2023

(54) BARCODE READER WITH TRANSFLECTIVE MIRROR

(71) Applicant: ZEBRA TECHNOLOGIES CORPORATION, Lincolnshire, IL (US)

(72) Inventors: Darran Michael Handshaw, Sound Beach, NY (US); Edward Barkan, Miller Place, NY (US); Mark Drzymala, Saint James, NY (US); Dariusz J. Madej, Shoreham, NY (US); Christopher W. Brock, Manorville, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 17/463,291

(22) Filed: Aug. 31, 2021

(65) Prior Publication Data
US 2023/0061029 A1    Mar. 2, 2023

(51) Int. Cl.
*G06K 7/10*    (2006.01)
(52) U.S. Cl.
CPC ..... *G06K 7/10831* (2013.01); *G06K 7/10732* (2013.01); *G06K 7/10881* (2013.01)

(58) Field of Classification Search
CPC .......... G06K 7/10831; G06K 7/10732; G06K 7/10881
USPC ....................................... 235/462.01–462.49
See application file for complete search history.

(56) References Cited

U.S. PATENT DOCUMENTS

2017/0011243 A1* 1/2017 Hammer ............ G06K 7/10722

* cited by examiner

*Primary Examiner* — Jamara A Franklin
(74) *Attorney, Agent, or Firm* — Yuri Astvatsaturov

(57) ABSTRACT

Barcode readers and methods for directing fields-of-view of imaging sensors of barcode readers are disclosed herein. An example barcode reader includes a housing, an imaging sensor positioned within the housing, and a transflective mirror positioned within the housing and in a path of a field-of-view of the imaging sensor. The transflective mirror reflects at least a first portion of the field-of-view of the imaging sensor in a first direction with the transflective mirror in a reflective state and allows the field-of-view of the imaging sensor to pass through and continue in a second direction, different than the first direction, with the transflective mirror in a transmissive state.

10 Claims, 12 Drawing Sheets

BARCODE READER WITH TRANSFLECTIVE MIRROR

BACKGROUND

Typical barcode readers, such as handheld barcode readers and direct part marking scanners, have required either multiple imaging sensors or one or more splitter mirrors to divide a field-of-view of a single imaging sensor to multiple fields-of-view for the barcode reader, for example, to provide fields-of-view in different directions, to provide different size fields-of-view, etc. Similarly, typical bioptic barcode readers have required either multiple image sensors or one or more splitter mirrors to divide a field-of-view of a single imaging sensor to direct field-of-view through both horizontal and upright windows.

For barcode readers, it could be beneficial if a single imaging sensor could be used to provide multiple fields-of-view for the barcode reader without having to divide the field-of-view of the imaging sensor. Similarly, for bioptic barcode readers, it could be beneficial if a single imaging sensor could be used and directed out of both the horizontal and upright windows without having to divide the field-of-view of the imaging sensor.

SUMMARY

In an embodiment, the present invention is a barcode reader comprising a housing, a first imaging sensor positioned within the housing, and a transflective mirror positioned within the housing and in a path of a first field-of-view of the first imaging sensor.

In a variation of this embodiment, the barcode reader comprises a window positioned in the housing and an illumination source positioned within the housing and configured to direct illumination through the window. The first field-of-view of the first imaging sensor passes out the window with an axis of the first field-of-view of the first imaging sensor parallel to an illumination axis of the illumination source with the transflective mirror in the transmissive state. The first portion of the first field-of-view of the first imaging sensor is reflected by the transflective mirror towards a mirror and passes out the window with a reflected axis of the first field-of-view of the first imaging sensor non-parallel to the illumination axis of the illumination source with the transflective mirror in the reflective state.

In another variation of this embodiment, the barcode reader comprises a mirror positioned within the housing. The first field-of-view of the first imaging sensor passes through the transflective mirror and the first lens with the transflective mirror in the transmissive state. The first portion of the first field-of-view of the first imaging sensor is reflected by the transflective mirror and towards the mirror with the transflective mirror in the reflective state.

In another variation of this embodiment, the barcode reader comprises a second imaging sensor positioned within the housing, a first mirror positioned within the housing and configured to direct a second field-of-view of the second imaging sensor out of a horizontal window of the housing, a second mirror positioned within the housing in the path of the first field-of-view of the first imaging sensor, and a third mirror positioned within the housing and configured to direct the first field-of-view of the first imaging sensor out of an upright window of the housing. The first field-of-view of the first imaging sensor is reflected by the transflective mirror towards the third mirror with the transflective mirror in the reflective state. The first field-of-view of the first imaging sensor passes through the transflective mirror and is reflected by the second mirror towards the third mirror with the transflective mirror in the transmissive state.

In another embodiment, the present invention is a bioptic barcode reader comprising a housing with a horizontal window and an upright window, an first imaging sensor positioned within the housing, a transflective mirror positioned within the housing and in a path of a first field-of-view of the first imaging sensor, a first mirror positioned within the housing and configured to direct the first field-of-view of the first imaging sensor out of the horizontal window, and a second mirror positioned within the housing and configured to direct the first field-of-view of the first imaging sensor out of the upright window. The transflective mirror allows the first field-of-view of the first imaging sensor to pass through with the transflective mirror in a transmissive state. The transflective mirror reflects at least a first portion of the first field-of-view of the first imaging sensor with the transflective mirror in a reflective state.

In a variation of this embodiment, the bioptic barcode reader comprises a second transflective mirror positioned within the housing between the transflective mirror and the first mirror and in the path of the first field-of-view of the first imaging sensor. The first field-of-view of the first imaging sensor passes through the transflective mirror and the second transflective mirror and towards the first mirror with the transflective mirror in the transmissive state and the second transflective mirror in the transmissive state. The first field-of-view of the first imaging sensor is reflected by the transflective mirror towards the second mirror with the transflective mirror in the reflective state. The first field-of-view of the first imaging sensor passes through the transflective mirror and is reflected by the second transflective mirror towards the second mirror with the transflective mirror in the transmissive state and the second transflective mirror in the reflective state.

In another variation of this embodiment, the bioptic barcode reader comprises a third mirror positioned within the housing and configured to direct the first field-of-view of the first imaging sensor out of the upright window and a second transflective mirror positioned within the housing between the transflective mirror and the first mirror and in the path of the first field-of-view of the first imaging sensor. The first field-of-view of the first imaging sensor passes through the transflective mirror and the second transflective mirror and towards the first mirror with the transflective mirror in the transmissive state and the second transflective mirror in the transmissive state. The first portion of the first field-of-view of the first imaging sensor is reflected by the transflective mirror towards the second mirror with the transflective mirror in the reflective state. The first portion of the first field-of-view of the first imaging sensor passes through the transflective mirror and is reflected towards the third mirror by the second transflective mirror with the transflective mirror in the transmissive state and the second transflective mirror in the reflective state.

In another variation of this embodiment, the bioptic barcode reader comprises a third mirror positioned within the housing and configured to direct the first field-of-view of the first imaging sensor out of the upright window and a second transflective mirror positioned within the housing adjacent the transflective mirror and in the path of the first field-of-view of the first imaging sensor. The first field-of-view of the first imaging sensor passes through the transflective mirror and the second transflective mirror and towards the first mirror with the transflective mirror in the transmissive state and the second transflective mirror in the transmissive state. A first portion of the first field-of-view of the first imaging sensor is reflected by the transflective mirror towards the second mirror with the transflective mirror in the reflective state. A second portion of the first field-of-view of the first imaging sensor is reflected by the second transflective mirror towards the third mirror with the second transflective mirror in the reflective state.

In another embodiment, the present invention is a method of directing a first field-of-view of a first imaging sensor in a barcode reader, comprising the steps of: positioning the first imaging sensor within a housing of the barcode reader; positioning a transflective mirror in a path of the first field-of-view of the first imaging sensor; and switching the transflective mirror between a transmissive state and a reflective state such that the transflective mirror reflects at least a first portion of the first field-of-view of the first imaging sensor in a first direction with the transflective mirror in a reflective state and allows the first field-of-view of the first imaging sensor to pass through and continue in a second direction, different than the first direction, with the transflective mirror in a transmissive state.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
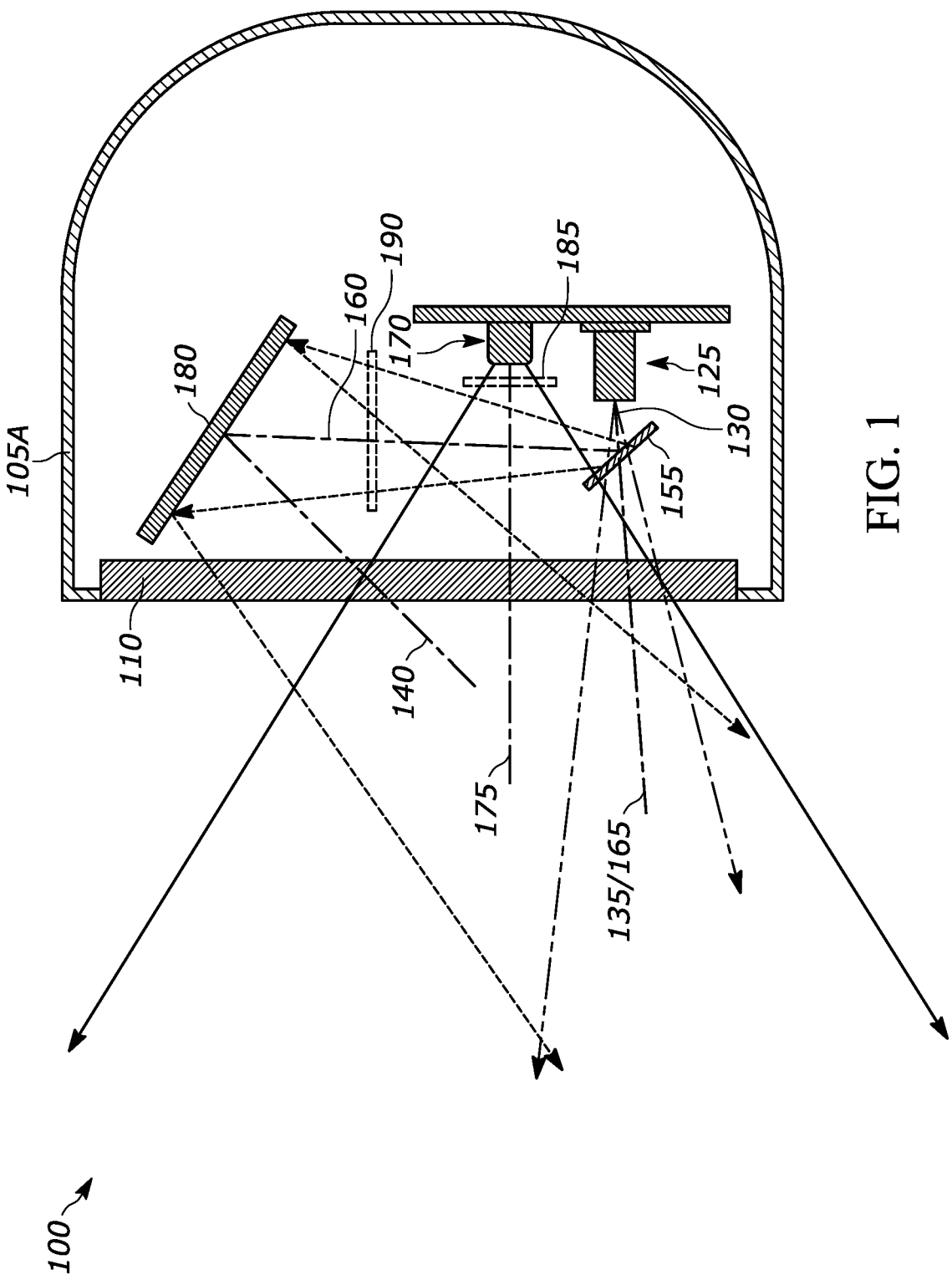
FIG. 1 illustrates a side cross-sectional schematic view of a first example barcode reader having a transflective mirror and an illumination source.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Figure 2:
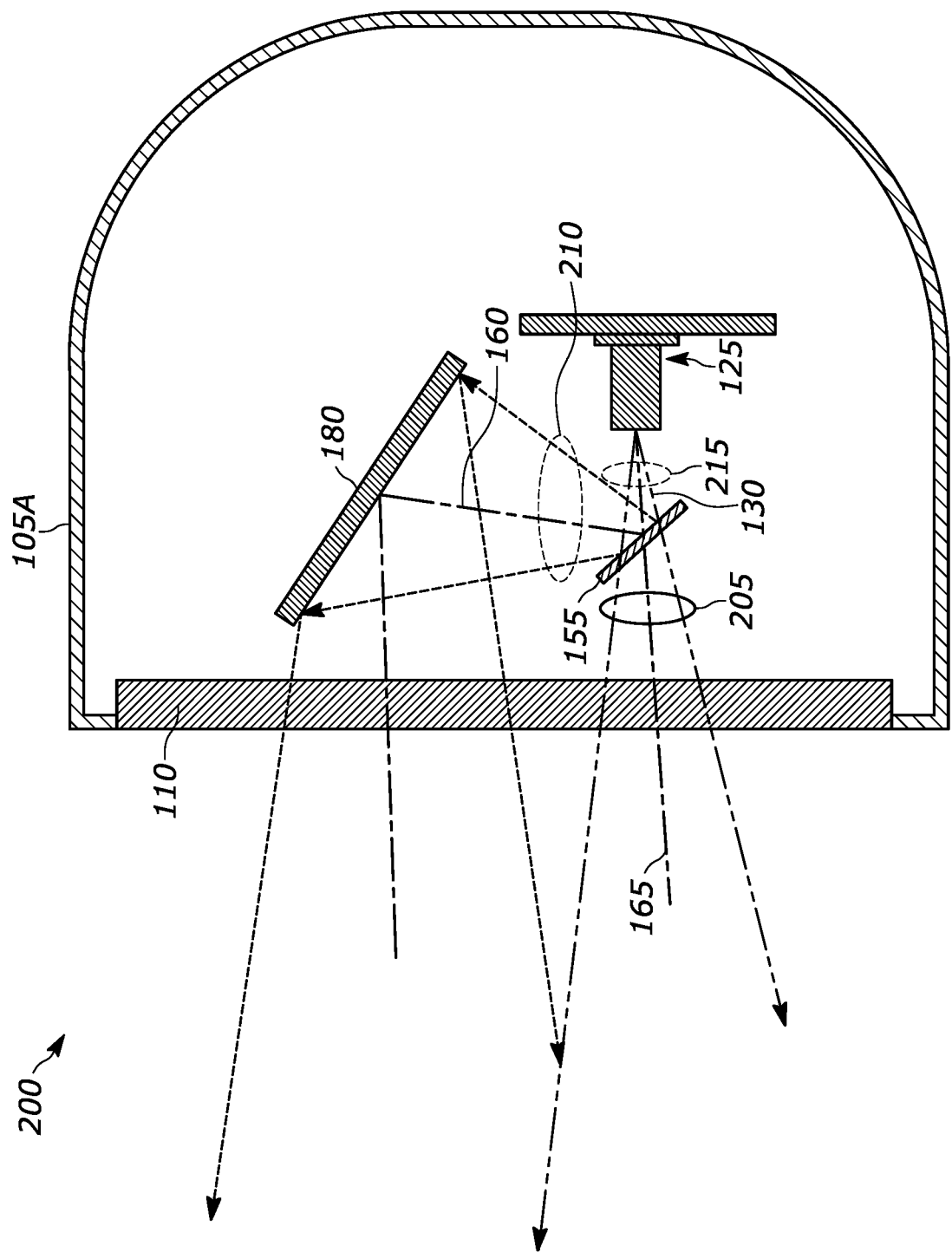
FIG. 2 illustrates a side cross-sectional schematic view of a second example barcode reader having a transflective mirror and a lens.
Figure 3:
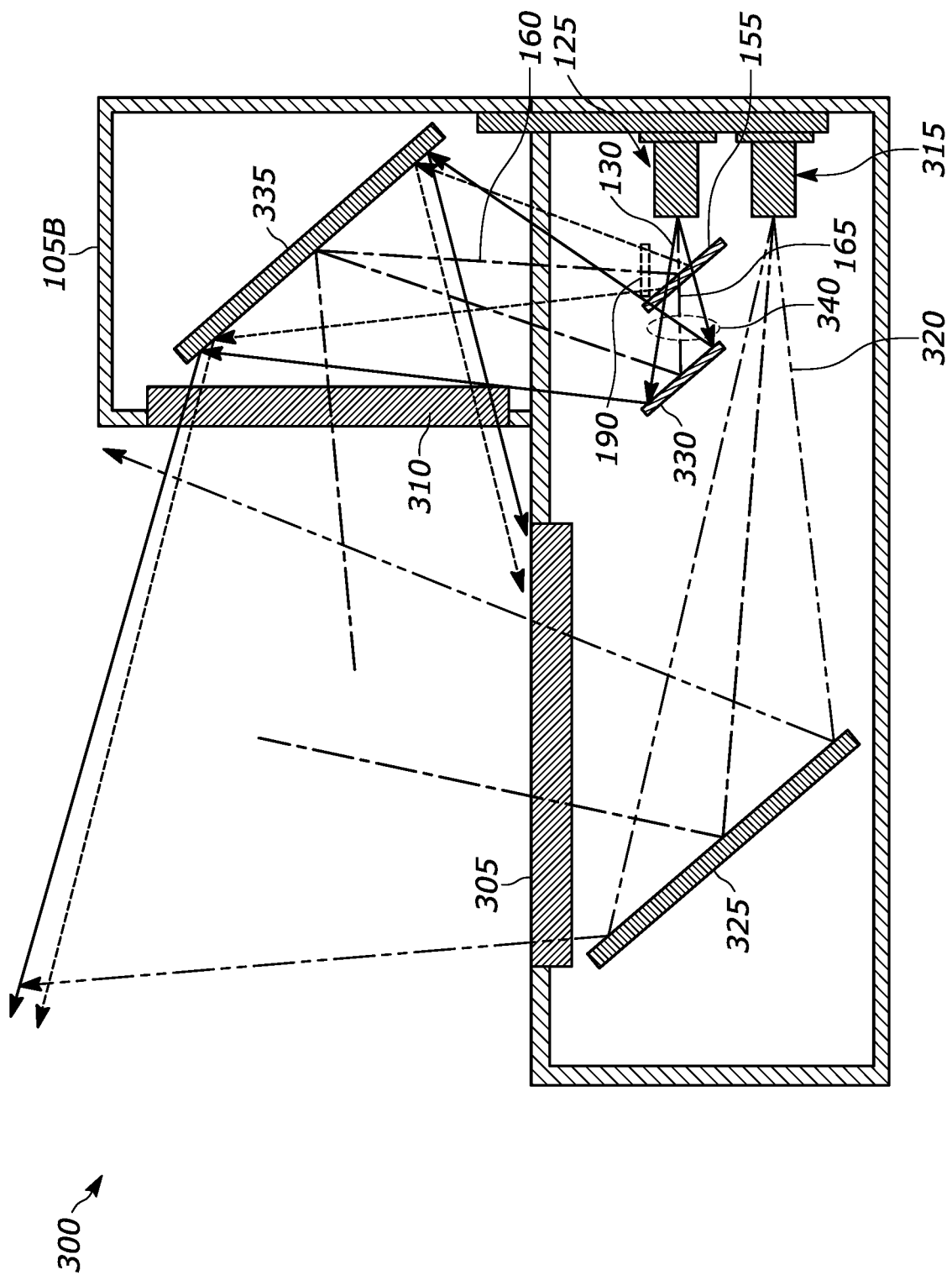
FIG. 3 illustrates a side cross-sectional schematic view of a third example barcode reader having first and second transflective imaging sensors.

Referring to FIGS. 1-3, example barcode readers 100, 200, 300 are shown that use a transflective mirror in the path of a field-of-view of the imaging sensor to create a switchable secondary field-of-view that can extend at a different angle than the original field-of-view, have a different size than the original field-of-view, etc. In the examples shown, barcode readers 100, 200, 300 include a housing 105A/105B, an first imaging sensor 125 positioned within housing 105A/105B, and a transflective mirror 155, such as the e-TransFlector™ from Kent Optronics, positioned within housing 105A/105B and in a path of a first field-of-view 130 of first imaging sensor 125. Transflective mirror 155 can be switched between a transmissive state, in which a majority of light is allowed to pass through transflective mirror 155, and a reflective state, in which a majority of light is reflected off of transflective mirror 155. With transflective mirror 155 in the reflective state, transflective mirror 155 reflects at least a first portion of first field-of-view 130 of first imaging sensor 125 in a first direction 160. While first field-of-view 130 can be split such that only a portion of first field-of-view 130 is reflected by transflective mirror 155, as shown in the examples, preferably first field-of-view 130 of first imaging sensor 125 is not divided and the first portion of first field-of-view 130 is the entire first field-of-view 130. With transflective mirror 155 in the transmissive state, transflective mirror 155 allows first field-of-view 130 to pass through transflective mirror 155 and continue in a second direction 165, different that first direction 160. Optionally, transflective mirror 155 could also be switched to a partially reflective state, in which transflective mirror 155 would both direct first field-of-view 130 in first direction 160 and allow first field-of-view 130 to pass through transflective mirror 155 and continue in second direction 165.

In one possible configuration, the switching of transflective mirror 155 between the reflective and transmissive states can be synchronized with a frame rate of first imaging sensor 125 such that transflective mirror 155 changes states between the reflective and transmissive states between each image capture of first imaging sensor 125. Therefore, with an imaging sensor having a frame rate of 120 frames-per-second, there would still be 60 frames-per-second captured when transflective mirror 155 is in the transmissive state and 60 frames-per-second captured when transflective mirror 155 is in the reflective state. Alternatively, transflective mirror 155 can be switched between the transmissive and reflective states at any rate and time desired. For example, in a second possible configuration, the switching of transflective mirror 155 between the reflective and transmissive states can be synchronized with the frame rate of first imaging sensor 125 such that transflective mirror 155 alternates and changes state between the reflective and transmissive states after two image captures of first imaging sensor 125 and then changes back between the reflective and transmissive states after one image capture of first imaging sensor 125. This can be particularly useful in barcode readers where it is expected that the barcodes on products will be presented for reading in a manner or direction that will produce more or more successful reads in one particular manner or direction. In this circumstance, transflective mirror 155 can be set to one state where more or more successful reading of a barcodes is expected and read barcodes for two image captures of first imaging sensor 125, switch states to the other state where less or less successful reading of barcodes is expected and read barcodes for one image capture of first imaging sensor 125, switch back to the original state for two image captures, etc. This allows the barcode reader to capture more images where it is most likely a barcode will be presented for reading. Alternatively, in a third possible configuration, the switching of transflective mirror 155 between the reflective and transmissive states can be based on information gathered from prior image captures by first imaging sensor 125. For example, prior image captures by first imaging sensor 125 could show that there are more, or a predetermined number of, successful decodes of barcodes with transflective mirror 155 in either the reflective or transmissive state and the switching of transflective mirror 155 between states can be set so that there are more image capture attempts with transflective mirror 155 in the state with the greater or predetermined number of successful image captures. In addition, prior image captures by first imaging sensor 125 could show the presence of a specular reflection when images are captured with transflective mirror 155 in one state and the switching of transflective mirror 155 between states can be set so that there are more image capture attempts with transflective mirror 155 in the state with less specular reflections. Furthermore, prior image captures by first imaging sensor 125 could identify that a particular item is being presented to the barcode reader or identify a particular feature of a barcode (e.g., the "L-shape" at the corner) or QR code (e.g., the targets) and the switching of transflective mirror 155 between states can be set so that there are more images capture attempts with transflective mirror 155 in the state where the barcode is expected to be found.

Referring specifically to FIG. 1, barcode reader 100 also includes a window 110 positioned within housing 105A and an illumination source 170, such as a light emitting diode, positioned within housing 105A and configured to direct illumination through window 110, which allows the full first field-of-view 130 of first imaging sensor 125 to be directed at different angles through window 110. Unless specified in a particular example, illumination source 170 can be an illumination assembly or an aiming assembly. Aiming assemblies typically provide some very defined illumination pattern to help a user visualize some portion of a field-of-view and illumination assemblies help to deliver sufficient light into the direction of the field-of-view to sufficiently illuminate a target that is within that field-of-view for image capture (similar to a flash on a camera). These systems are normally independent.

Aiming assemblies and illumination assemblies are also generally activated at different times. This is because a broad illumination of a field-of-view through an illumination assembly (especially one that has diffuse light) will do little to identify the defined features of a field-of-view. For instance, due to the scattered nature of diffuse light, such light cannot provide a defined feature like an image of a dot, which could reference a center of a field-of-view or an image of a line that could reference a boundary of a field-of-view. In addition, a broad illumination of a field-of-view can impede the ability to clearly identify an aim light pattern by overpowering the light emitted by the aiming assembly with the light emitted by the illumination assembly. Conversely, a defined aim pattern visible during image capture when the target is being illuminated can interfere with the content of the image data, particularly when the target is a barcode. A visible aim mark positioned over a barcode and captured in an image can interfere with the ability to accurately read that barcode.

In barcode reader 100, first field-of-view 130 of first imaging sensor 125 passes through transflective mirror 155 and out window 110 along axis 135 and the illumination passes through window 110 along illumination axis 175, which is parallel to axis 135 of first field-of-view 130 of first imaging sensor 125, with transflective mirror 155 in the transmissive state. In addition, the first portion of first field-of-view 130 of first imaging sensor 125 is reflected by transflective mirror 155 towards a mirror 180 positioned within housing 105A and reflects off of mirror 180 and out window 110 along reflected axis 140, which is non-parallel to illumination axis 175 of illumination source 170 with transflective mirror 155 in the reflective state. In the particular example shown, first field-of-view 130 of first imaging sensor 125 is not divided and the first portion of first field-of-view 130 is the entire first field-of-view 130 of first imaging sensor 125. Having first field-of-view 130 of first imaging sensor 125 directed out of window 110 along different axes, parallel and non-parallel to the illumination axis 175 of illumination source 170, can be useful for direct part marking scanners and long-range barcode readers looking to avoid specular reflections at closer distances by achieving off-axis illumination. This helps with specular performance and retains farther ranges.

If desired, polarizers can also be included in barcode reader 100 to help eliminate or reduce specular reflections. For example, a polarizer 185 can be positioned in front of illumination source 170 to filter the illumination from illumination source 170 into a desired polarization. In addition, another polarizer 190, or cross-polarizer, can be positioned between transflective mirror 155 and mirror 180 to filter the off-axis light reflected off of mirror 180 and transflective mirror 155 (in the reflective state) towards first imaging sensor 125. Preferably, polarizer 190 is oriented such that the polarization of polarizer 190 is perpendicular to the polarization of polarizer 185. In this configuration, the on-axis light that passes through transflective mirror 155 in the transmissive state would not be polarized.

Referring specifically to FIG. 2, barcode reader 200 also includes window 110, mirror 180 positioned within housing 105A, and a first lens 205 positioned within housing 105A on an opposite side of transflective mirror 155 from first imaging sensor 125. In barcode reader 200, the first field-of-view 130 of first imaging sensor 125 passes through transflective mirror 155 and first lens 205 and out window 110 with transflective mirror 155 in the transmissive state. In addition, the first portion of first field-of-view 130 of first imaging sensor 125 is reflected by transflective mirror 155 towards mirror 180, and reflected by mirror 180 out window 110, with transflective mirror 155 in the reflective state. In the particular example shown, first field-of-view 130 of first imaging sensor 125 is not divided and the first portion of first field-of-view 130 is the entire first field-of-view 130 of first imaging sensor 125. Optionally, depending on the application, a second lens 210 could also be positioned between transflective mirror 155 and mirror 180 so that the first portion of first field-of-view 130 passes through second lens 210 with transflective mirror 155 in the reflective state and/or a third lens 215 can be positioned between the first imaging sensor 125 and transflective mirror 155 so that first field-of-view 130 passes through third lens 215. In this example, transflective mirror 155 is used to direct first field-of-view 130 of first imaging sensor 125 through various different combinations of lens systems, which can be used to provide different size fields-of-view out of window 110, different focuses, different zooms, etc. For example, by redirecting first field-of-view 130 of first imaging sensor 125 through a lens system that either decreases or increases the focus distance, a close range barcode reader is effectively combined with a long-range barcode reader in the same device. In addition, first lens 205 or second lens 210 can also be a polarizing lens to filter the light received by first imaging sensor 125 from first direction 165 or second direction 160 into a desired polarization. If first lens 205 or second lens 210 is a polarizing lens, the illumination from an illumination source (not shown) in barcode reader 200 would also be polarized, preferably in a direction that is perpendicular to the polarization of first lens 205 or second lens 210. If second lens 210 is the polarizing lens, the light received by first imaging sensor 125 from second direction 160 with transflective mirror in the reflective state would be polarized and the light received by first imaging sensor 125 from the first direction 165 with transflective mirror in the transmissive sate would not be polarized. Conversely, if first lens 205 is the polarizing lens, the light received by first imaging sensor 125 from second direction 160 with transflective mirror in the reflective state would not be polarized and the light received by first imaging sensor 125 from the first direction 165 with transflective mirror in the transmissive state would be polarized.

Figure 2A:
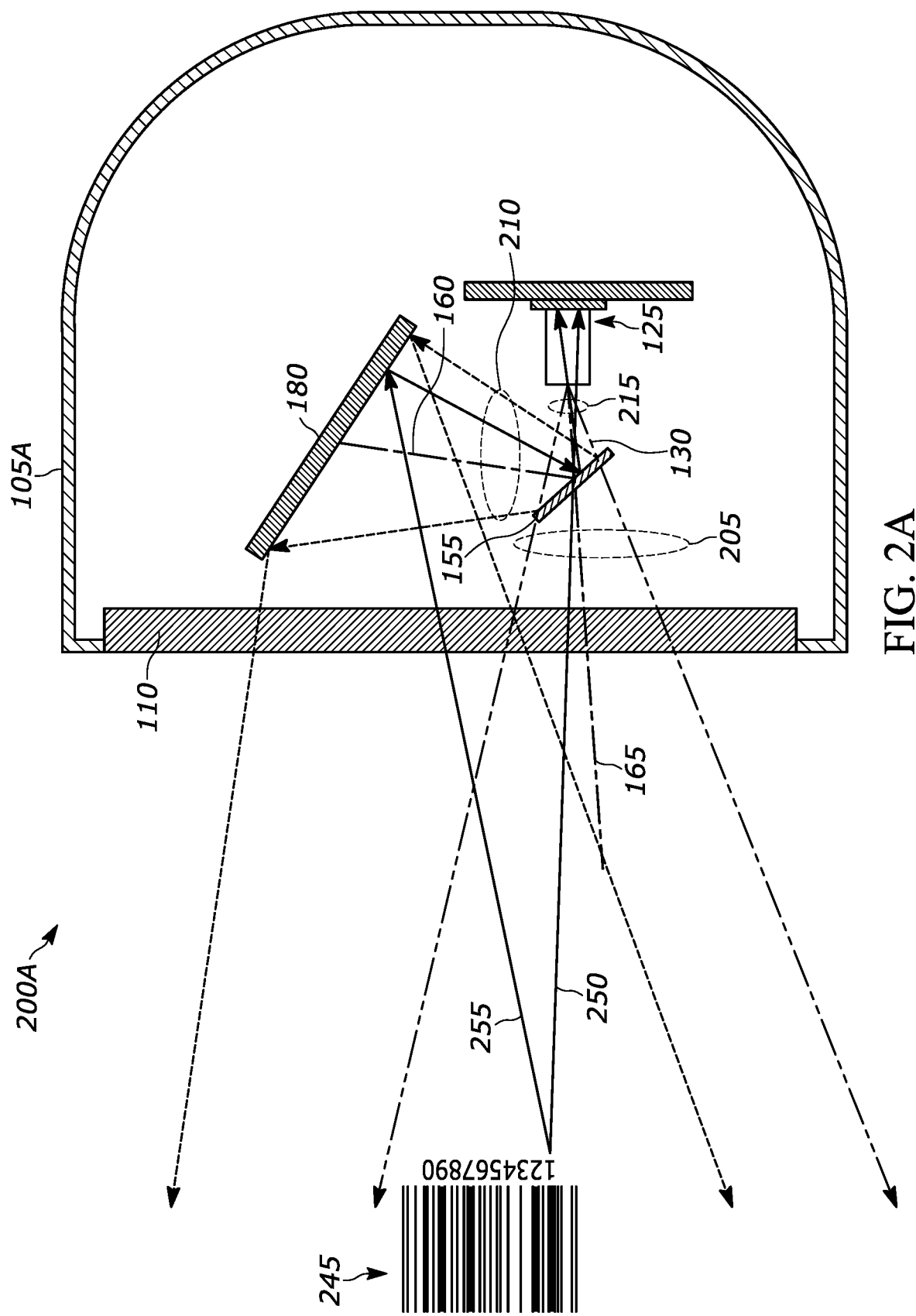
FIG. 2A illustrates a side cross-sectional schematic view of an alternate configuration of the second example barcode reader of FIG. 2.

The general configuration of barcode reader 200 can also be adapted to be able to determine the distance of a barcode or object from the barcode reader. For example, as shown in FIG. 2A, barcode reader 200A also includes window 110 and mirror 180 positioned within housing 105A. Like barcode reader 200, in barcode reader 200A the first field-of-view 130 of first imaging sensor 125 passes through transflective mirror 155 and first lens 205 and out window 110 with transflective mirror 155 in the transmissive state. In addition, the first portion of first field-of-view 130 of first imaging sensor 125 is reflected by transflective mirror 155 towards mirror 180, and reflected by mirror 180 out window 110, with transflective mirror 155 in the reflective state. In the particular example shown, first field-of-view 130 of first imaging sensor 125 is not divided and the first portion of first field-of-view 130 is the entire first field-of-view 130 of first imaging sensor 125. Based on the offset of first field-of-view 130 of first imaging sensor 125 out of window 100 with transflective mirror 155 in the transmissive state and first field-of-view 130 of first imaging sensor 125 out of window 100 with transflective mirror 155 in the reflective state, features of the barcode or object will be captured at different positions or pixels on first imaging sensor 125 with transflective mirror 155 in the different states. This shift in position/pixel for a common feature between the image captures with transflective mirror 155 in different states can then be used to determine the distance of the barcode or object from barcode reader 200A. For example, as shown by line 250 in FIG. 2A, with transflective mirror 155 in the transmissive state a particular feature of a barcode 245 (e.g., the first number in the barcode, a corner of the barcode, the first line in the barcode, etc.) will be detected and captured by first imaging sensor 125 at a particular pixel, or set of pixels. Conversely, as shown by line 255 in FIG. 2A, with transflective mirror 155 in the reflective state the same feature of barcode 245 will be detected and captured by first imaging sensor 125 at a different pixel, or set of pixels. Knowing the size and direction of first field-of-view 130 of first imaging sensor 125 out of window 110 with transflective mirror 155 in the transmissive and reflective states, the distance between the pixel(s) in the captured images with transflective mirror 155 in each state can then be used to determine the distance of barcode 245 from barcode reader 200A. Alternatively, rather than comparing an image capture with transflective mirror 155 in the transmissive state to an image capture with transflective mirror 155 in the reflective state, transmissive mirror 155 could be switched to the partially reflective state and the distance between the pixels detecting the common feature can then be determined from a single image capture.

As discussed above for barcode reader 200, depending on the configuration and application, in barcode reader 200A first lens 205 could be positioned within housing 105A on an opposite side of transflective mirror 155 from first imaging sensor 125, second lens 210 could be positioned between transflective mirror 155 and mirror 180, and/or third lens 215 can be positioned between the first imaging sensor 125 and transflective mirror 155 to provide different size fields-of-view out of window 110, different focuses, different zooms, etc. For example, by redirecting first field-of-view 130 of first imaging sensor 125 through a lens system that either decreases or increases the focus distance, a close range barcode reader is effectively combined with a long-range barcode reader in the same device. In addition, first lens 205 or second lens 210 can also be a polarizing lens to filter the light received by first imaging sensor 125 from first direction 165 or second direction 160 into a desired polarization. If first lens 205 or second lens 210 is a polarizing lens, the illumination from an illumination source (not shown) in barcode reader 200 would also be polarized, preferably in a direction that is perpendicular to the polarization of first lens 205 or second lens 210. If second lens 210 is the polarizing lens, the light received by first imaging sensor 125 from second direction 160 with transflective mirror in the reflective state would be polarized and the light received by first imaging sensor 125 from the first direction 165 with transflective mirror in the transmissive sate would not be polarized. Conversely, if first lens 205 is the polarizing lens, the light received by first imaging sensor 125 from second direction 160 with transflective mirror in the reflective state would not be polarized and the light received by first imaging sensor 125 from the first direction 165 with transflective mirror in the transmissive sate would be polarized.

Referring specifically to FIG. 3, barcode reader 300 is a bioptic barcode reader that also includes a second imaging sensor 315, a first mirror 325, a second mirror 330, and a third mirror 335 positioned within housing 105B. First mirror 325 is positioned in a second field-of-view 320 of second imaging sensor 315 and is configured to reflect field-of-view and direct second field-of-view 320 out of a horizontal window 305 of housing 105B. Second mirror 330 is positioned in first field-of-view 130 of first imaging sensor 125 on an opposite side of transflective mirror 155 from first imaging sensor 125. Third mirror 335 is positioned in-line first field-of-view 130 reflected from transflective mirror 155 and second mirror 330 and is configured to direct first field-of-view 130 out of an upright window 310 of housing 105B. In barcode reader 300, first field-of-view 130 of first imaging sensor 125 is reflected by transflective mirror 155 towards third mirror 335, and reflected by third mirror 335 and out upright window 310, with transflective mirror 155 in the reflective state. In addition, first field-of-view 130 of first imaging sensor 125 passes through transflective mirror 155, is reflected by second mirror 330 towards third mirror 335, and is reflected by third mirror 335 out upright window 310 with transflective mirror 155 in the transmissive state. As shown in FIG. 3, in barcode reader 300, because of the longer path length traveled by first field-of-view 130 with transflective mirror 155 in the transmissive state, the first field-of-view 130 of first imaging sensor 125 that is reflected out of upright window 310 with transflective mirror 155 in the transmissive state is larger than the first field-of-view 130 of first imaging sensor 125 reflected out of upright window 310 with transflective mirror 155 in the reflective state. Having the full first field-of-view 130 of first imaging sensor 125 directed out of upright window 310 with two alternating size field-of-view can provide various benefits, such as using the larger field-of-view to wake up the system and using the smaller field-of-view to provide the actually capture of barcodes, etc. In addition, with transflective mirror 155 in the partially reflective state, additional benefits can be provided, such as being able to see an overlaid image of both fields-of-view in order to monitor for wakeup or for other purposes. Depending on the application, a lens 340 can also be positioned between transflective mirror 155 and second mirror 330 and in the path of first field-of-view 130 of first imaging sensor 125 to further differentiate the size, focus, or zoom of the two fields-of-view directed out of upright window. In addition, a polarizer 190 can be positioned between transflective mirror 155 and third mirror 335 to filter the light through upright window 310 reflected off of third mirror 335 and transflective mirror 155 (in the reflective state) towards first imaging sensor 125. In this position, light through upright window 310 reflected off of third mirror 335 and second mirror 330 and passing through transflective mirror 155 in the transmissive state would not be polarized. If polarizer 190 is used, the illumination directed out of upright window 310 from an illumination source (not shown) in barcode reader 300 would also be polarized, preferably in a direction that is perpendicular to the polarization of polarizer 190.

Referring to FIGS. 4-8, example bioptic barcode readers 400A, 400B, 500, 600, 700 are shown that include a housing 405 with a horizontal window 410 and an upright window 415, an first imaging sensor 420 positioned within housing 405, a first transflective mirror 440, such as the e-TransFlector™ from Kent Optronics, a first mirror 445, and a second mirror 450 positioned within housing 405, which allows the entire first field-of-view 425 of first imaging sensor 420 to be utilized through both horizontal window 410 and upright window 415. Sharing the full first field-of-view 425 of first imaging sensor 420 between both windows saves on cost and complexity and achieves a higher resolution for better performance and longer ranges on high density codes through both windows. In addition, it also allows the use of a larger angle, which gives better performance on barcodes that are rotated away from a window as the barcodes are swiped through the scan volume. In bioptic barcode readers 400A, 400B, 500, 600, 700, first transflective mirror 440 is positioned in a path of a first field-of-view 425 of first imaging sensor 420, first mirror 445 is configured to reflect and direct first field-of-view 425 out of horizontal window 410, and second mirror 450 is configured to reflect and direct first field-of-view 425 out of upright window 415. First transflective mirror 440 can be switched between a transmissive state, in which a majority of light is allowed to pass through first transflective mirror 440, and a reflective state, in which a majority of light is reflected off of first transflective mirror 440. With first transflective mirror 440 in the reflective state, first transflective mirror 440 reflects at least a first portion of first field-of-view 425 of first imaging sensor 420 towards second mirror 450. In the particular examples shown, first field-of-view 425 of first imaging sensor 420 is not divided and the first portion of first field-of-view 425 is the entire first field-of-view 425. With first transflective mirror 440 in the transmissive state, first transflective mirror 440 allows first field-of-view 425 to pass through first transflective mirror 440 towards first mirror 445. In addition, with first transflective mirror 440 in the partially reflective state, additional benefits may be provided, such as being able to see overlaid images of first field-of-view 425 through both horizontal window 410 and upright window 415 in order to monitor for wakeup or for other purposes.

In one possible configuration, the switching of first transflective mirror 440 between the reflective and transmissive states can be synchronized with a frame rate of first imaging sensor 420 such that first transflective mirror 440 changes states between the reflective and transmissive states between each image capture of first imaging sensor 420. Therefore, with an imaging sensor having a frame rate of 120 frames-per-second, there would still be 60 frames-per-second captured through horizontal window 410 and 60 frames-per-second captured through upright window 415. Alternatively, first transflective mirror 440 can be switched between the transmissive and reflective states at any rate and time desired. For example, in a second possible configuration, the switching of first transflective mirror 440 between the reflective and transmissive states can be synchronized with the frame rate of first imaging sensor 420 such that first transflective mirror 440 alternates and changes state between the reflective and transmissive states after two image captures of first imaging sensor 420 and then changes back between the reflective and transmissive states after one image capture of first imaging sensor 420. This can be particularly useful where it is expected that the barcodes on products will be presented for reading in one window of the bioptic barcode reader more than in the other. For example, if the bioptic barcode reader is to be used by an employee in a typical checkout lane and it is expected that the barcodes will be presented to the horizontal window more than the upright window, first transflective mirror 440 can be set to the transmissive state to capture images through the horizontal window for two image captures of first imaging sensor 420, switch states to the reflective state to capture images through the upright window for one image capture of first imaging sensor 420, switch back to the transmissive state for two image captures, etc. This allows the bioptic barcode reader to capture more images where it is most likely a barcode will be presented for reading. Alternatively, in a third possible configuration, the switching of first transflective mirror 440 between the reflective and transmissive states can be based on information gathered from prior image captures by first imaging sensor 420. For example, prior image captures by first imaging sensor 420 could show that there are more, or a predetermined number of, successful decodes of barcodes with first transflective mirror 440 in either the reflective or transmissive state and the switching of first transflective mirror 440 between states can be set so that there are more image capture attempts with first transflective mirror 440 in the state with the greater or predetermined number of successful image captures. In addition, prior image captures by first imaging sensor 420 could identify that a particular item is being presented to the bioptic barcode reader and the switching of first transflective mirror 440 between states can be set so that there are more images capture attempts with first transflective mirror 440 in the state where the barcode is expected to be found.

Figure 4:
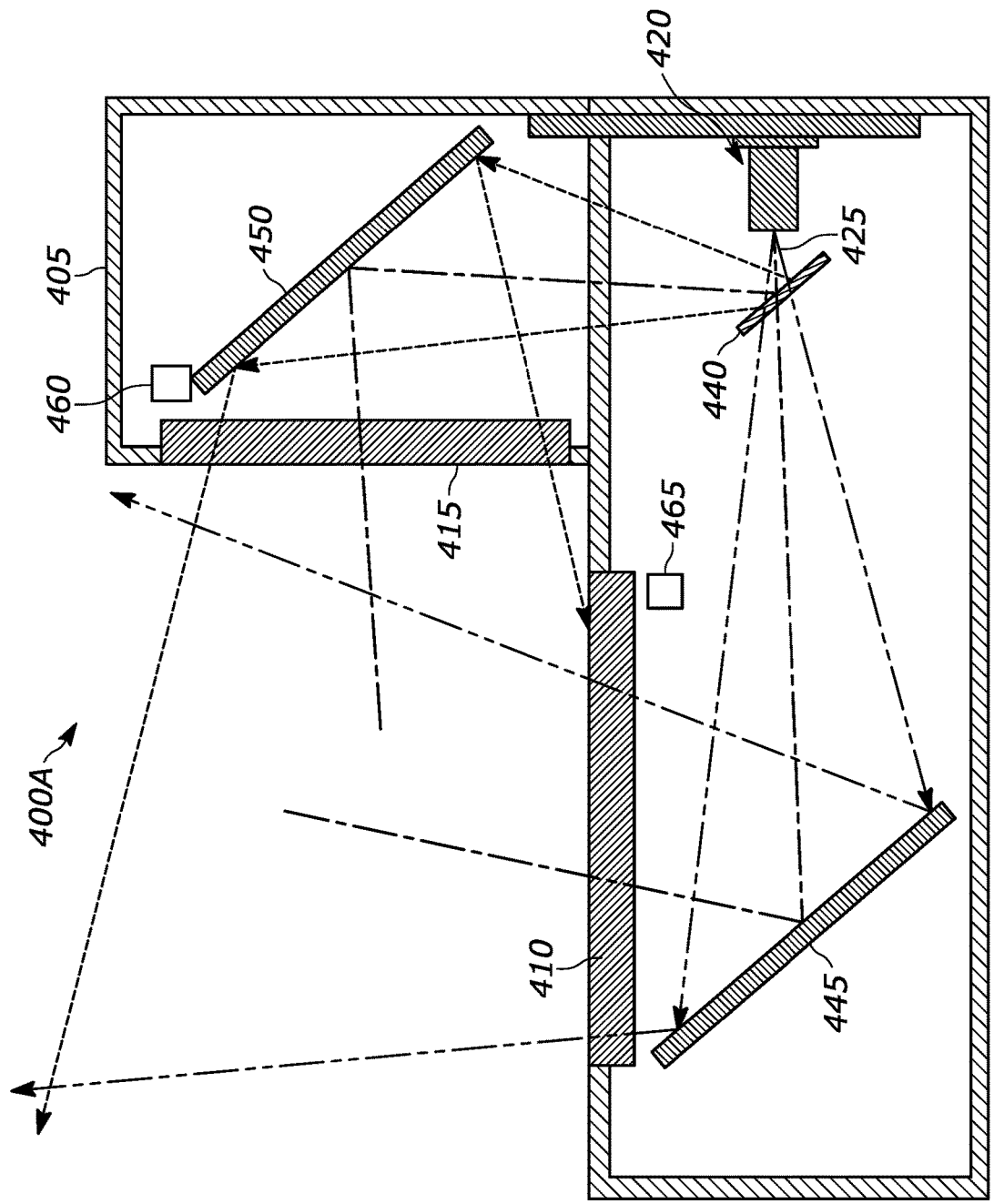
FIG. 4 illustrates a side cross-sectional schematic view of a first example bioptic barcode reader with a field-of-view of an imaging sensor oriented horizontally.
Figure 5:
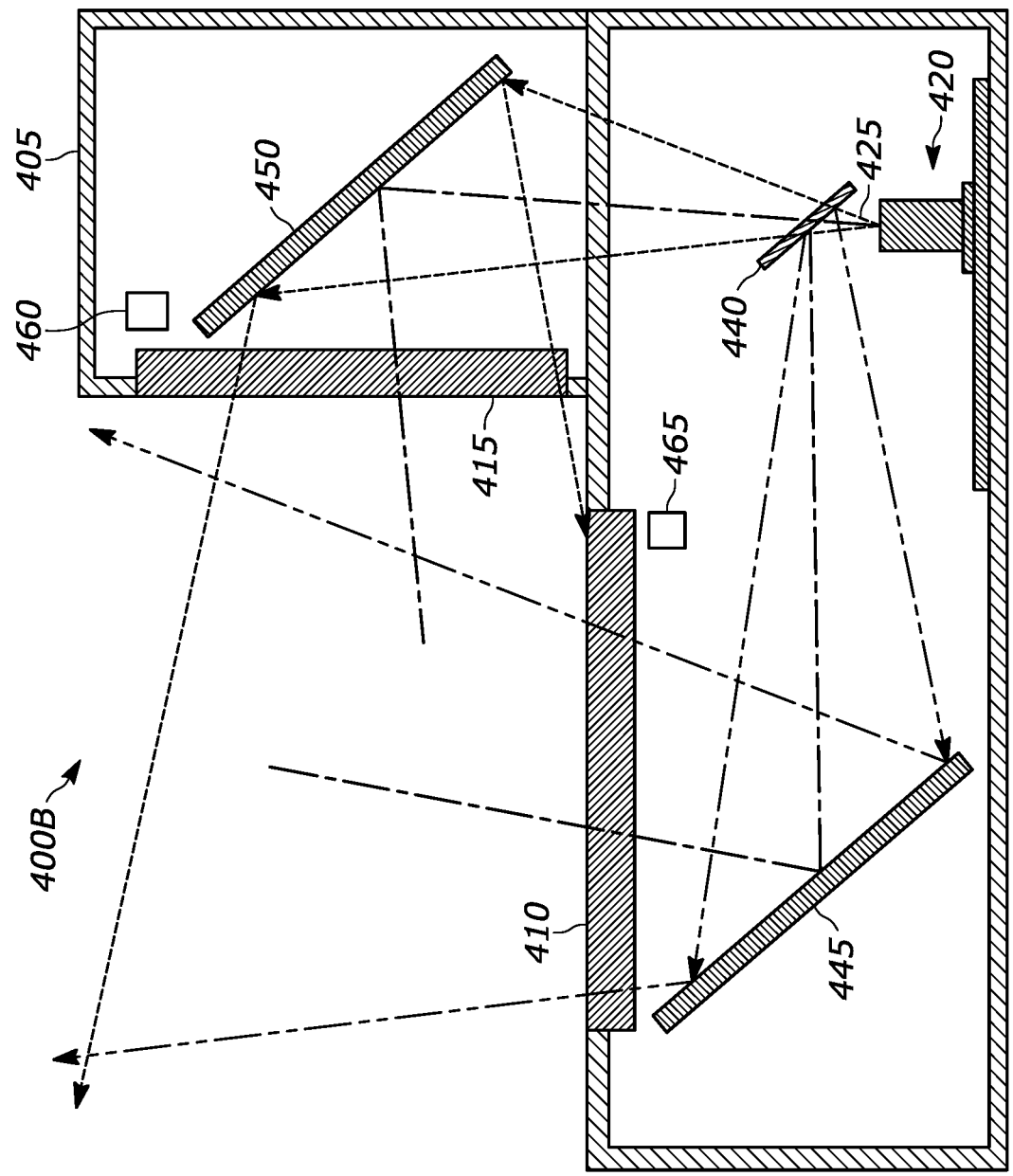
FIG. 5 illustrates a side cross-sectional schematic view of a second example bioptic barcode reader with the field-of-view of the imaging sensor oriented vertically.

Referring specifically to FIGS. 4 and 5, first imaging sensor 420 in bioptic barcode reader 400A is positioned such that first field-of-view 425 is directed generally horizontal, or generally parallel to horizontal window 410. In this example, first transflective mirror 440 allows first field-of-view 425 of first imaging sensor 420 to pass through first transflective mirror 440 and continue towards first mirror 445 with first transflective mirror 440 in the transmissive state and reflects the first portion of first field-of-view 425 of first imaging sensor 420 towards second mirror 450 with first transflective mirror 440 in the reflective state. Conversely, first imaging sensor 420 in bioptic barcode reader 400B is positioned such that first field-of-view 425 is directed generally vertical, or generally perpendicular to horizontal window 410. In this example, first transflective mirror 440 allow first field-of-view 425 of first imaging sensor 420 to pass through first transflective mirror 440 and continue towards second mirror 450 with first transflective mirror 440 in the transmissive state and reflects the first portion of first field-of-view 425 towards first mirror 445 with first transflective mirror 440 in the reflective state.

In addition, bioptic barcode readers 400A, 400B could also have a first illumination system 460 that is configured to turn on with first transflective mirror 440 in the reflective state and turn off with transflective mirror in the transmissive state and a second illumination system 465 that is configured to turn on with first transflective mirror 440 in the transmissive state and turn off with first transflective mirror 440 in the reflective state. This provides illumination only through the particular window that images are being capture through and can avoid the creation of specular reflections. In the example shown in FIG. 4, first illumination system 460 is a vertical illumination system (provides illumination through upright window 415) and second illumination system 465 is a horizontal illumination system (provides illumination through horizontal window 410). Conversely, in the example shown in FIG. 5, first illumination system 460 is a horizontal illumination system and second illumination system 465 is a vertical illumination system.

Figure 6:
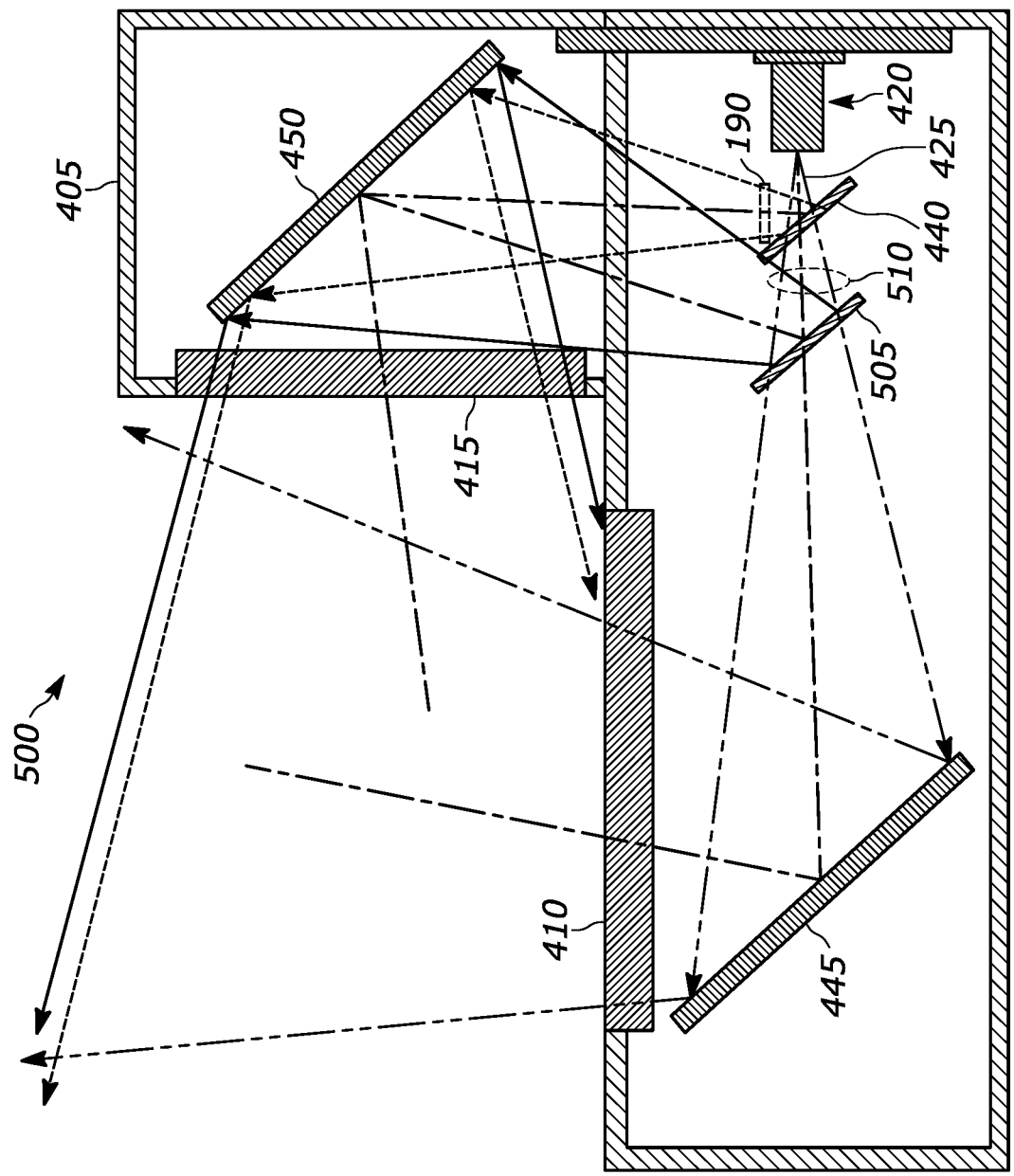
FIG. 6 illustrates side cross-sectional schematic view of a third example bioptic barcode reader having first and second transflective mirrors and a single mirror associated with the upright window.

Referring specifically to FIG. 6, bioptic barcode reader 500 also has a second transflective mirror 505, such as the e-TransFlector™ from Kent Optronics, positioned within housing 405 between first transflective mirror 440 and first mirror 445 and in the path of first field-of-view 425 of first imaging sensor 420. In bioptic barcode reader 500, first field-of-view 425 of first imaging sensor 420 passes through first transflective mirror 440, through second transflective mirror 505, and towards first mirror 445 with both first transflective mirror 440 and second transflective mirror 505 in the transmissive state. First field-of-view 425 of first imaging sensor 420 is reflected by first transflective mirror 440 towards second mirror 450, and is reflected by second mirror 450 and out upright window 415, with first transflective mirror 440 in the reflective state and second transflective mirror 505 in either the reflective or transmissive state. First field-of-view 425 of first imaging sensor 420 passes through first transflective mirror 440 and is reflected by second transflective mirror 505 towards second mirror 450, and is reflected by second mirror 450 and out upright window 415, with first transflective mirror 440 in the transmissive state and second transflective mirror 505 in the reflective state. By using first transflective mirror 440 and second transflective mirror 505 in sequence as shown, the path lengths traveled by first field-of-view 425 of first imaging sensor 420 before being directed out of upright window 415 will be different, which will provide different size fields-of-view out of upright window 415. This can be used to provide a larger field-of-view to be used as a wake up system, which provides the advantage of waking up bioptic barcode reader 500 before the barcode is in the smaller field-of-view for capture. In addition, depending on the application, a lens 510 can also be positioned between first transflective mirror 440 and second transflective mirror 505 and in a path of first field-of-view 425 of first imaging sensor 420 to further differentiate the size, focus, or zoom of the two fields-of-view directed out of upright window. In addition, a polarizer 190 can be positioned between first transflective mirror 440 and second mirror 450 to filter the light through upright window 310 reflected off of second mirror 450 and first transflective mirror 440 (in the reflective state) towards first imaging sensor 420. In this position, light through upright window 310 reflected off of second mirror 450 and second transflective mirror 505 (in the reflective state) and passing through first transflective mirror 440 in the transmissive state would not be polarized. If polarizer 190 is used, the illumination directed out of upright window 310 from an illumination source (not shown) in barcode reader 500 would also be polarized, preferably in a direction that is perpendicular to the polarization of polarizer 190.

Figure 7:
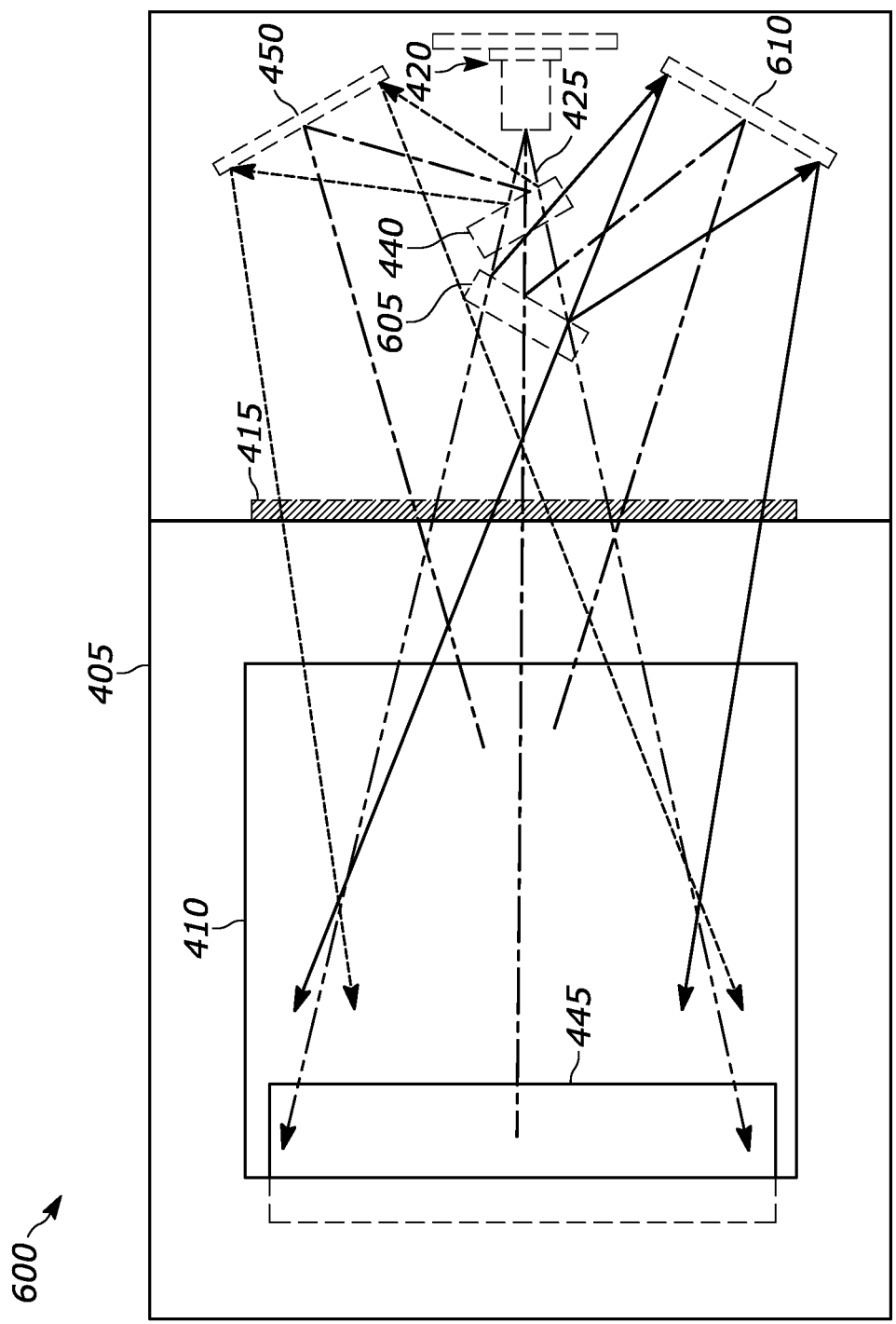
FIG. 7 illustrates a schematic top view of a fourth example bioptic barcode reader having first and second transflective mirrors and two mirrors associated with the upright window.

Referring specifically to FIG. 7, bioptic barcode reader 600 also includes a second transflective mirror 605 that is positioned between first transflective mirror 440 and first mirror 445 and in the path of first field-of-view 425 of first imaging sensor 420 and a third mirror 610 positioned within a path of first field-of-view 425 reflected from second transflective mirror 605 and configured to direct first field-of-view 425 out of upright window 415, which allows the entire first field-of-view 425 of first imaging sensor 420 to be directed into three field-of-view, one directed out of horizontal window 410 and two out of upright window 415 at different angles. In bioptic barcode reader 600, first field-of-view 425 passes through both first transflective mirror 440 and second transflective mirror 605 and towards first mirror 445 with both first transflective mirror 440 and second transflective mirror 605 in the transmissive state. First portion of first field-of-view 425 is reflected by first transflective mirror 440 towards second mirror 450, and is reflected by second mirror 450 out of upright window 415, with first transflective mirror 440 in the reflective state and second transflective mirror 605 in either the reflective or transmissive state. First portion of first field-of-view 425 passes through first transflective mirror 440 and is reflected towards third mirror 610 by second transflective mirror 605, and is reflected by third mirror 610 out of upright window 415, with first transflective mirror 440 in the transmissive state and second transflective mirror 605 in the reflective state. In the particular example shown, first field-of-view 425 of first imaging sensor 420 is not divided and the first portion of first field-of-view 425 is the entire first field-of-view 425 of first imaging sensor 420.

Figure 8:
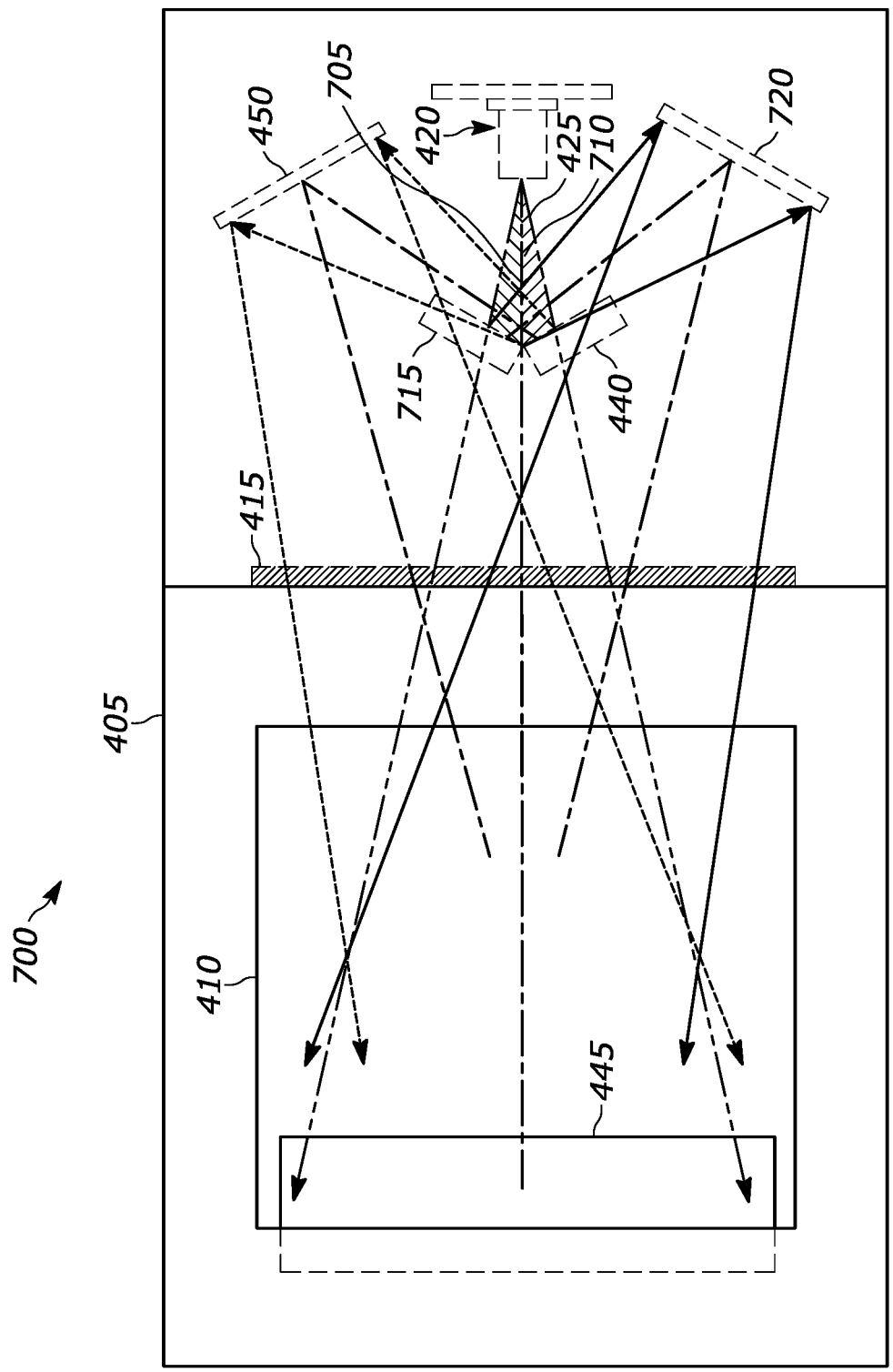
FIG. 8 illustrates a schematic top view of a fifth example bioptic barcode reader having first and second adjacent transflective mirrors and two mirrors associated with the upright window.

Referring specifically to FIG. 8, bioptic barcode reader 700 also includes a second transflective mirror 715, such as the e-TransFlector™ from Kent Optronics, positioned adjacent first transflective mirror 440 and in a path of first field-of-view 425 of first imaging sensor 420 and a third mirror 720 configured to direct first field-of-view 425 out of upright window 415, which also allows the entire first field-of-view 425 of first imaging sensor 420 to be directed into three field-of-view, one directed out of horizontal window 410 and two out of upright window 415 at different angles, with a slightly different configuration of transflective mirrors from that shown in FIG. 7. Second transflective mirror 715 and first transflective mirror 440 are preferably positioned to form a concave surface facing first imaging sensor 420. In bioptic barcode reader 700, first field-of-view 425 of first imaging sensor 420 passes through both first transflective mirror 440 and second transflective mirror 715, towards first mirror 445, and is reflected by first mirror out of horizontal window 410 with both first transflective mirror 440 and second transflective mirror 715 in the transmissive state. A first portion 705 of first field-of-view 425 is reflected by first transflective mirror 440 towards second mirror 450, and reflected by second mirror 450 out of upright window 415, and a second portion 710 of first field-of-view 425 is reflected by second transflective mirror 715 towards third mirror 720, and reflected by third mirror 720 out of upright window 415, with both first transflective mirror 440 and second transflective mirror 715 in the reflective state.

Figure 9:
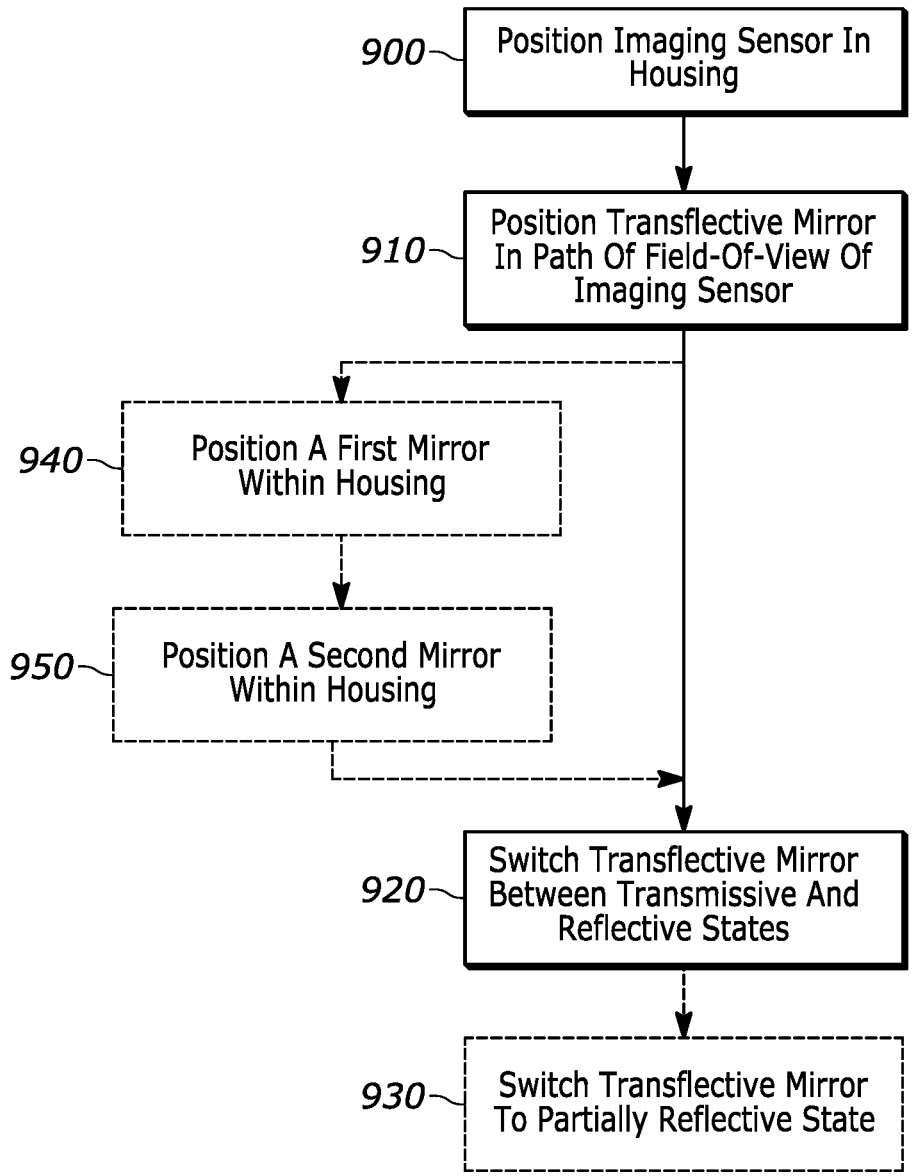
FIG. 9 illustrates an example flowchart for directing a field-of-view of an imaging sensor in a barcode reader.

Referring to FIG. 9, a flowchart illustrating an example method of directing a field-of-view of a first imaging sensor in a barcode reader, such as the various example barcode readers and bioptic barcode readers described above and shown in FIGS. 1-8, is shown. In this example method a first imaging sensor is positioned within a housing of the barcode reader at Step 900 and a transflective mirror is positioned in a path of the first field-of-view of the first imaging sensor at Step 910. Once the first imaging sensor and transflective mirror are positioned, at Step 920, the transflective mirror is switched between the transmissive state and the reflective state, such that the transflective mirror reflects at least a first portion of the first field-of-view of the first imaging sensor in a first direction with the transflective mirror in a reflective state and allows the first field-of-view of the imaging sensor to pass through and continue in a second direction, different than the first direction, with the transflective mirror in a transmissive state. As discussed above, while the transflective mirror can be used to reflect only a portion of the first field-of-view of the first imaging sensor, preferably, the first field-of-view of the first imaging sensor is not divided and the first portion of the first field-of-view of the first imaging sensor that is reflected by the transflective mirror is the entire first field-of-view of the first imaging sensor. The switching of the transflective mirror between the transmissive state and the reflective state can be synchronized with a frame rate of the first imaging sensor, such that the transflective mirror switches between the reflective state and the transmissive state between each image capture of the first imaging sensor, can be synchronized with a frame rate of the first imaging sensor such that the transflective mirror alternates and changes state between the reflective state and the transmissive state after two image captures of the first imaging sensor and then changes state between the reflective state and the transmissive state after one image capture of the first imaging sensor, or can be switched between the reflective state and the transmissive state based on information from prior image captures, such as a predetermined number of successful decodes with the transflective mirror in either the reflective or the transmissive state, a presence of specular reflection, or an identification of an item, as discussed above.

Optionally, at Step 930, the transflective mirror can also be switched to the partially reflective state, such that the transflective mirror reflects the first portion of the first field-of-view of the first imaging sensor in the first direction and allows the first field-of-view of the first imaging sensor to pass through the transflective mirror and continue in the second direction.

In addition, when using any of the bioptic barcode readers shown in FIGS. 4-8 and described above, the example method could also optionally include the steps of positioning a first mirror within the housing such that the transflective mirror allows the first field-of-view of the first imaging sensor to pass through and continue toward the first mirror and out of a horizontal window of the barcode reader with the transflective mirror in the transmissive state (Step 940) and positioning a second mirror within the housing such that the transflective mirror reflects the first portion of the first field-of-view of the first imaging sensor toward the second mirror and out of an upright window of the barcode reader with the transflective mirror in the reflective state (Step 950).

Figure 10:
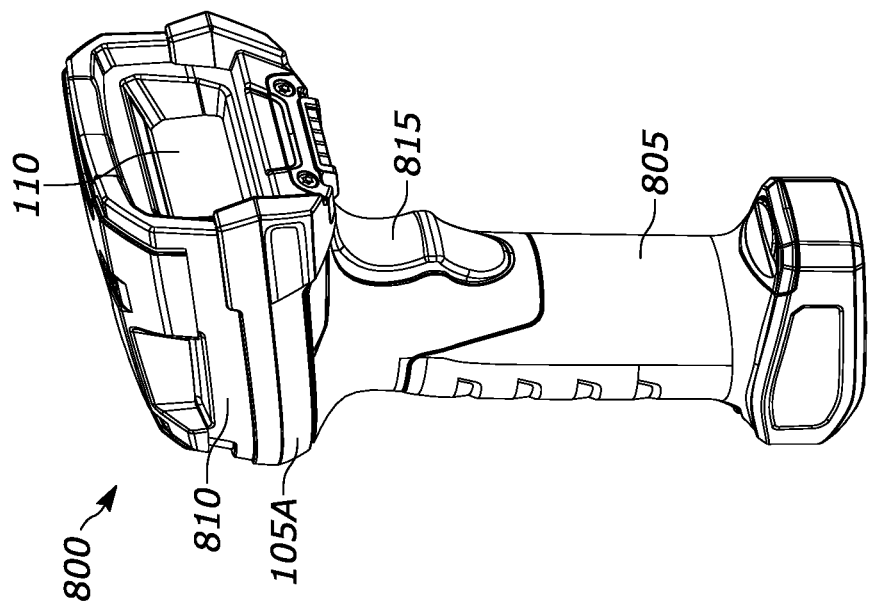
FIG. 10 illustrates a perspective view of an example barcode reader.

Referring to FIG. 10, an example barcode reader 800 is shown, which can be used to implement any of the examples shown and described herein, such as barcode readers 100, 200, and 200A. It will be understood that although a particular embodiment of barcode reader 800 is disclosed, this disclosure is applicable to a variety of barcode readers, including, but not limited to, gun-type handheld readers, mobile computer-type readers, presentation readers, etc. As illustrated in FIG. 10, exemplary barcode reader 800 has housing 105A with a handle portion 805, also referred to as a handle 805, and a head portion 810, also referred to as a scanning head 810. Head portion 810 includes window 110, and is configured to be positioned on the top of handle portion 805. Handle portion 805 is configured to be gripped by a user (not shown) and includes a trigger 815 for activation by the user. Optionally included in an example is also a base (not shown), also referred to as a base portion, that may be attached to handle portion 805 opposite head portion 810, and is configured to stand on a surface and support housing 105A in a generally upright position. Barcode reader 800 can be used in a hands-free mode as a stationary workstation when it is placed on a countertop or other workstation surface. Barcode reader 800 can also be used in a handheld mode when it is picked up off the countertop or base station, and held in the user's hand. In the hands-free mode, products can be slid, swiped past, or presented to the window 110 for barcode reader 800 to initiate barcode reading operations. In the handheld mode, barcode reader 800 can be moved towards a barcode on a product, and trigger 815 can be manually depressed to initiate imaging of the barcode. Other implementations may provide only handheld or only hands-free configurations. In the example of FIG. 10, barcode reader 800 is ergonomically configured for a user's hand as a gun-shaped housing, though other configurations may be utilized as understood by those of ordinary skill in the art. As shown, handle portion 805 extends below and rearwardly away from head portion 810 along a centroidal axis obliquely angled relative to axis 135 of first field-of-view 130 of first imaging sensor 125 within head portion 810.

Figure 11:
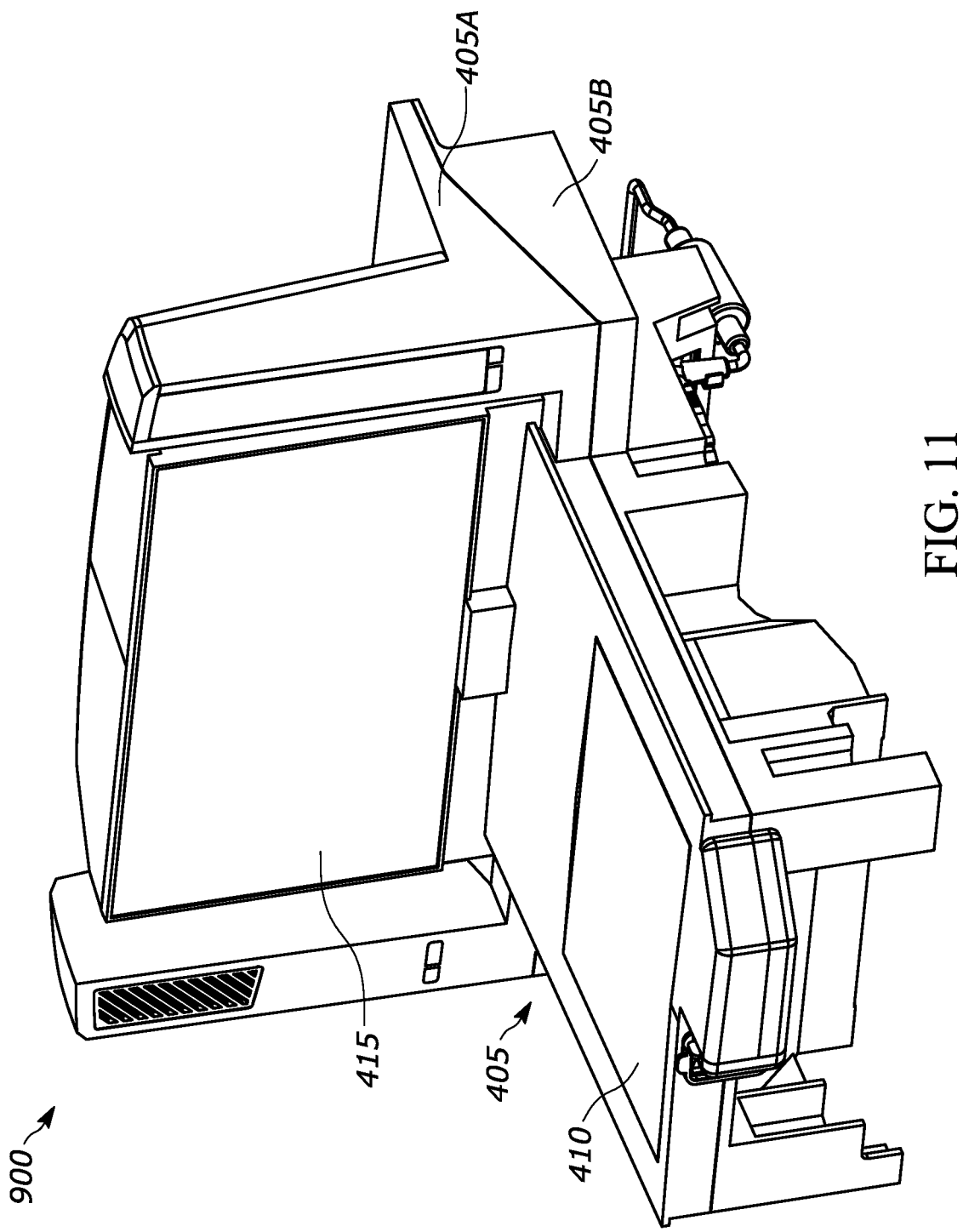
FIG. 11 illustrates a perspective view of an example bioptic barcode reader.

Referring to FIG. 11, an example bioptic barcode reader 900 is shown, which can be used to implement any of the examples shown and described herein, such as barcode reader 300 and bioptic barcode readers 400A, 400B, 500, 600, and 700. Bioptic barcode reader 900 can be installed in a workstation, a counter, or other workspace to allow products or items to be moved through a scanning region of bioptic barcode reader 900 to read and decode barcodes on the products or items presented in a scanning region of bioptic barcode reader 900. As illustrated in FIG. 11, bioptic barcode reader 900 generally includes housing 405, which in the example shown includes an upper housing portion 405A and a lower housing portion 405B secured directly to upper housing portion 405A, for example with threaded members.

Alternatively, housing 405 can also include one or more intermediate housing portions positioned between upper housing portion 405A and lower housing portion 405B. Horizontal window 410 is positioned in housing 405 and, in the example shown, is positioned in a horizontally extending portion of upper housing portion 405A. Upright window 415 is also positioned in housing 405 and, in the example shown, is positioned in a vertically extending or tower portion of upper housing portion 405A.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The claims are:

1. A barcode reader, comprising:
   a housing;
   a first imaging sensor positioned within the housing;
   a transflective mirror positioned within the housing and in a path of a first field-of-view of the first imaging sensor; wherein the transflective mirror reflects at least a first portion of the first field-of-view of the first imaging sensor in a first direction with the transflective mirror in a reflective state and allows the first field-of-view of the first imaging sensor to pass through and continue in a second direction, different than the first direction, with the transflective mirror in a transmissive state;
   a second imaging sensor positioned within the housing;
   a first mirror positioned within the housing and configured to direct a second field-of-view of the second imaging sensor out of a horizontal window of the housing;
   a second mirror positioned within the housing in the path of the first field-of-view of the first imaging sensor; and
   a third mirror positioned within the housing and configured to direct the first field-of-view of the first imaging sensor out of an upright window of the housing;
   wherein
   the first field-of-view of the first imaging sensor is reflected by the transflective mirror towards the third mirror with the transflective mirror in the reflective state; and
   the first field-of-view of the first imaging sensor passes through the transflective mirror and is reflected by the second mirror towards the third mirror with the transflective mirror in the transmissive state.

2. The barcode reader of claim 1, comprising a lens positioned between the transflective mirror and the second mirror and in the path of the first field-of-view of the first imaging sensor.

3. The barcode reader of claim 1, wherein the first field-of-view of the first imaging sensor is not divided.

4. The barcode reader of claim 1, wherein the first portion of the first field-of-view of the first imaging sensor is an entire first field-of-view of the first imaging sensor.

5. The barcode reader of claim 1, wherein the transflective mirror directs the first field-of-view of the first imaging sensor in the first direction and allows the first field-of-view of the first imaging sensor to pass through and continue in the second direction in a partially reflective state.

6. The barcode reader of claim 1, wherein the transflective mirror is synchronized with a frame rate of the first imaging sensor such that the transflective mirror alternates and changes state between the reflective state and the transmissive state after two image captures of the first imaging sensor and then changes state between the reflective state and the transmissive state after one image capture of the first imaging sensor.

7. The barcode reader of claim 1, wherein information from prior image captures includes a predetermined number of successful decodes with the transflective mirror in either the reflective or the transmissive state, a presence of specular reflection, or an identification of an item.

8. The barcode reader of claim 1, further comprising:
an illumination source positioned within the housing and configured to direct illumination through the window, wherein
the first field-of-view of the first imaging sensor passes out the upright window with an axis of the first field-of-view of the first imaging sensor parallel to an illumination axis of the illumination source with the transflective mirror in the transmissive state; and
the first portion of the first field-of-view of the first imaging sensor passes out the horizontal window with a reflected axis of the first field-of-view of the first imaging sensor non-parallel to the illumination axis of the illumination source with the transflective mirror in the reflective state.

9. The barcode reader of claim 8, wherein the first portion of the first field-of-view of the first imaging sensor is an entire first field-of-view of the first imaging sensor.

10. The barcode reader of claim 1, wherein information from prior image captures includes a predetermined number of successful decodes with the transflective mirror in either the reflective or the transmissive state, a presence of specular reflection, or an identification of an item.

* * * * *